G. FELTY.
MOTOR VEHICLE.
APPLICATION FILED APR. 9, 1910.
1,120,188.
Patented Dec. 8, 1914.
3 SHEETS—SHEET 1.
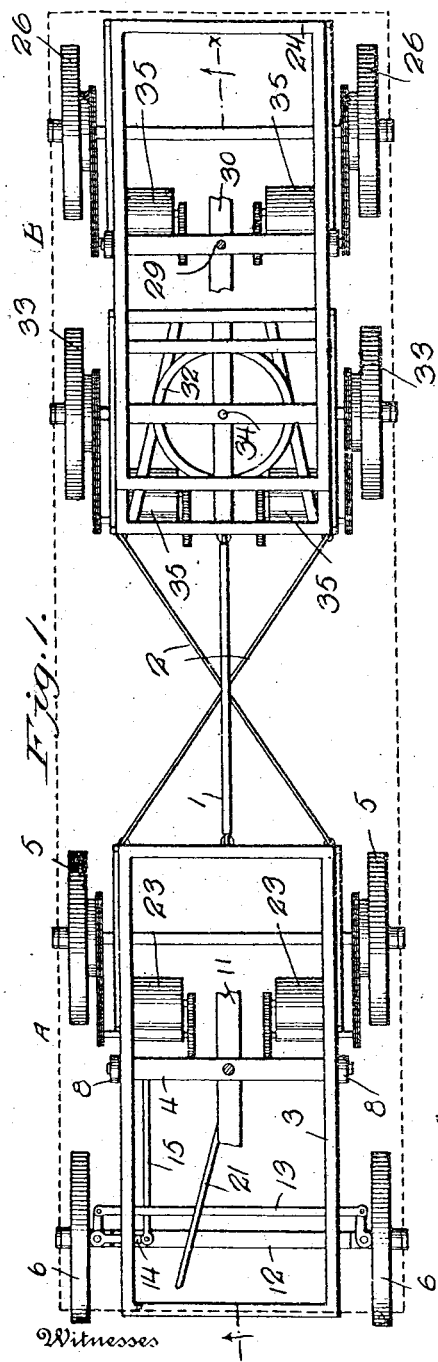
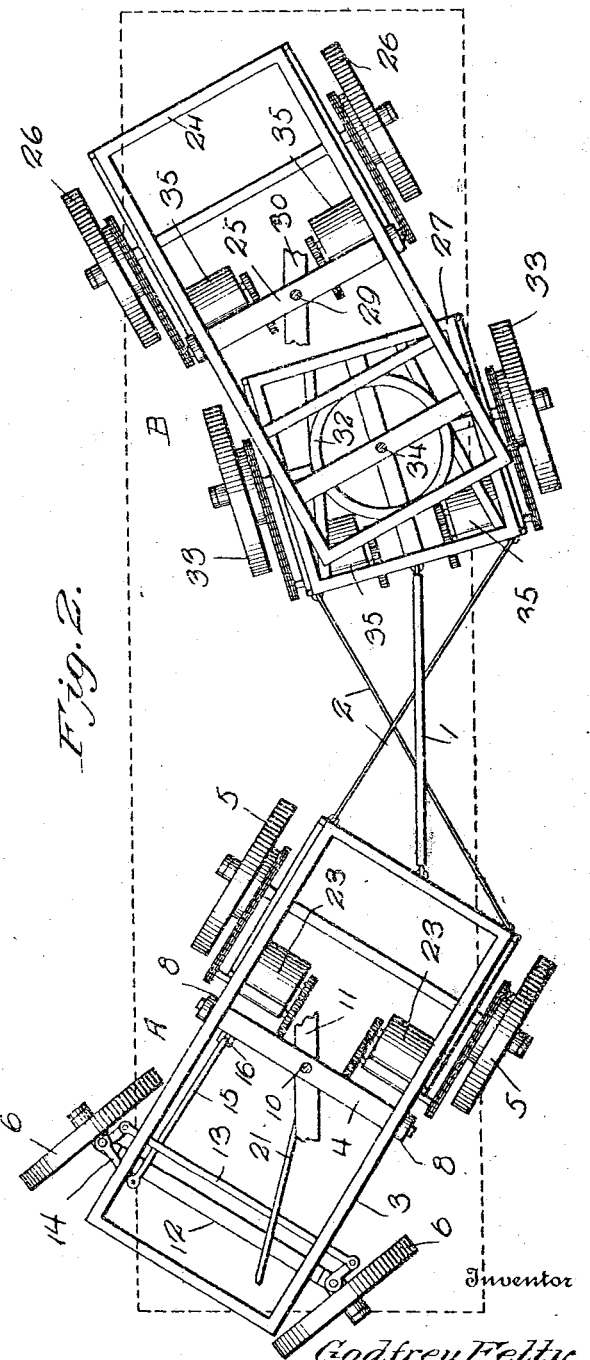
Witnesses
Edwin G. McKee
V. B. Hillyard
Inventor
Godfrey Felty
By Victor J. Evans
Attorney

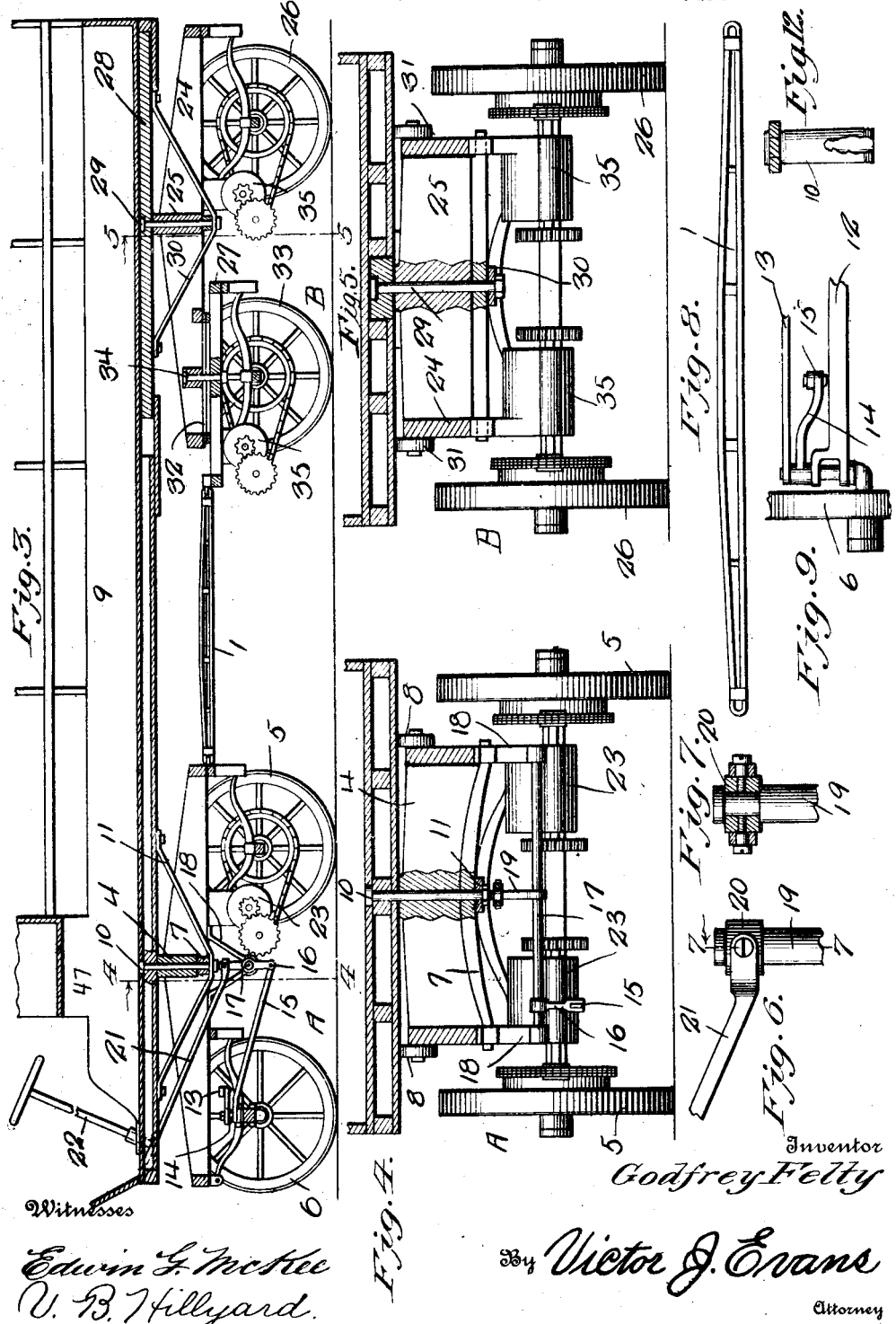

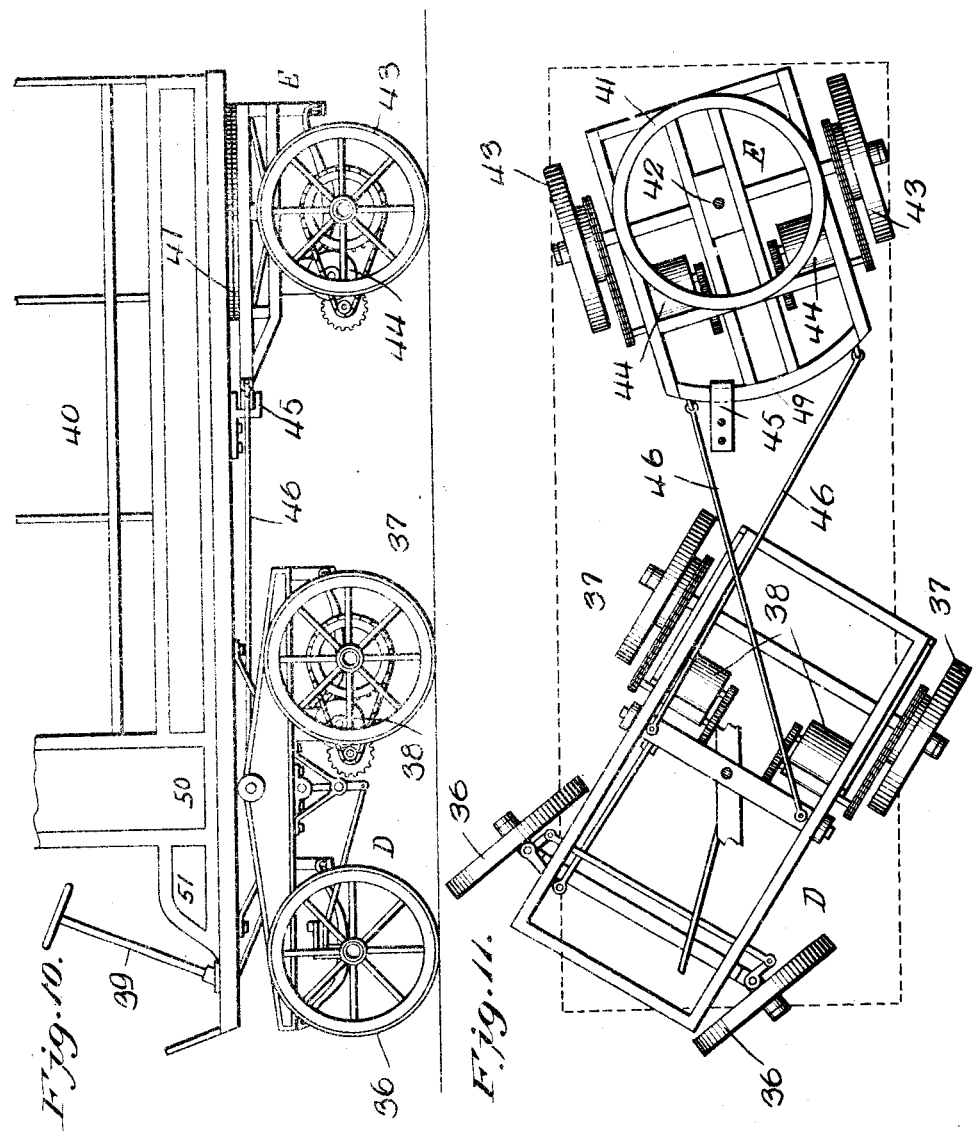

UNITED STATES PATENT OFFICE.

GODFREY FELTY, OF CUMBERLAND, MARYLAND.

MOTOR-VEHICLE.

1,120,188.  Specification of Letters Patent.  Patented Dec. 8, 1914.

Application filed April 9, 1910. Serial No. 554,398.

*To all whom it may concern:*

Be it known that I, GODFREY FELTY, a citizen of the United States, residing in Cumberland, in the county of Allegany, in the State of Maryland, have invented a new and Improved Motor-Vehicle, of which the following is a full and exact description.

The present invention relates to motor vehicles in the class mentioned, the object being to provide a vehicle with a plurality of pairs of driving wheels journaled on solid axles to insure durability and positive driving efficiency.

Another object is to provide a vehicle of this class, whereby the power source and the driver's seat may be arranged in the body, so as to be carried on the front truck, since the truck is provided with both driving and steering means to admit of correct loading and other utility advantages.

A further object is to provide the vehicle with a novel steering arrangement, whereby the said driving and steering truck is readily responsive to the turning of a steering post, located on the extreme forward end of the body in advance of the driver's seat, and out of alinement of the universal jointed connecting parts between body and truck.

Another object is to arrange the universal jointed connection between body and truck by means of a revolubly and pivotally connected bolster, which is adapted to endure hard knocks and the like, admit the truck to tilt or oscillate about a horizontal axis and turn about a vertical axis to adjust with uneven road surface and the connections of the steering gears.

A still further object is to provide the said front truck with connecting means to automatically turn the rear truck in opposite directions, thereby enabling the vehicle to turn in comparatively small space without additional hardship to turn the steering post.

With the foregoing objects, together with a view of durability and simplicity of construction and other features, the invention consists of the novel features, detail of construction and combination of parts which hereinafter will be more particularly set forth, illustrated in the accompanying drawings and pointed out in the appended claims.

Referring to the drawings forming a part of the application: Figure 1 is a top plan view of an eight wheel vehicle, embodying the invention, showing the several wheels and trucks in alinement. Fig. 2 is a view of the parts shown in Fig. 1, the trucks being moved to a position to enable the running gear to make a short turn. Fig. 3 is a vertical longitudinal section on the line X—X— of Fig. 1, the body being in position. Fig. 4 is a transverse section on the line 4—4 of Fig. 3, parts being broken away. Fig. 5 is a transverse section on the line 5—5 of Fig. 3, parts being broken away. Fig. 6 is a detailed view in elevation of the universal joint formed between the rod and arm of the steering mechanism. Fig. 7 is a sectional view on the line 7—7 of Fig. 6, the arm being in full. Fig. 8 is a side view of the coupling bar between the front and hind trucks. Fig. 9 is a detailed view of a steering knuckle and adjunctive parts. Fig. 10 is a side view of a six wheel vehicle, embodying the invention. Fig. 11 is a top plan view of the six wheel vehicle and also illustrates a shorter coupling plan, if desired. Fig. 12 is a side view of a tubular king bolt.

Corresponding and like parts are referred to in the following description, and indicated in all the views of the drawings by the same reference character.

The running gear of the vehicle mentioned embodies fore and hind trucks A and B respectively, which are connected by means of a coupling bar 1 and equalizing connections 2, the latter consisting of cables, rods or the like, having a diagonal arrangement and crossing intermediate of their ends, the coupling bar 1 is loosely connected at its ends to the frame of the respective trucks and comprises upper and lower members which are spaced apart and strengthened by intermediate struts, which have spools pivotally arranged therein to engage or bear against the cables, which pass through the said spaces to take up the slack when in course of turning at a certain angle, as shown most clearly in Fig. 8. Hence, when the front truck is turned in one direction, the rear truck turns in the opposite direction.

The fore truck A comprises a main frame 3, preferably of rectangular form, a transverse bolster 4, drive wheels 5 and steering wheels 6. The side bars of the frame 3 have their upper edges sloping outwardly and downwardly toward the end of the frame, to provide clearance for the tilting of the truck about the horizontal axis. About the center of said frame an open space is provided for the bolster, a truss brace, steering and power connecting mechanism to freely operate thereabout and hereinafter more fully described.

The bolster 4 has projecting ends at its outer lower corners, preferably by means of a metal bar 7; the lower middle or submedial parts of bar 7 being curved upwardly to clear the space in line with the turning and oscillating center of the truck, hence, a common central or universal axis of the truck is provided where the universal joint 20 of the steering arm 19 is permitted to freely move, as most clearly shown in Fig. 4. The projecting ends of bar 7 are mounted in bearings, provided at the lower edges of the said side bars, said bearings are between the drive wheels 5 and steering wheels 6, and comparatively closer to the driving wheels 5, as most clearly shown in all the side view drawings.

The upper and outer corners of bolster 4 are provided with rollers 8, to engage the lower side of the body 9, to serve as anti-friction members.

A king bolt 10, which is by preference tubular, provides an open passage for the power transmitting connections between the power source and the trucks' driving mechanism, thereby providing means about the center of the truck to arrange the said connections adjustingly with the truck's turning and tilting movements. The said king bolt 10 pivotally connects the truck with the body of the vehicle since it passes through the bolster, the reinforcing bar 7 and a truss brace 11, which latter passes beneath the bolster and bar 7, and has its end portions secured to the body of the vehicle upon opposite sides of the bolster, thereby holding the bolster in erect position to turn relative to the body and the steering arm 19, and remain stationary, relative to said steering arm in fore and aft motion.

The steering wheels 6 are connected with the front axle 12 by means of steering knuckles in the well known manner, so that the wheels may be turned in unison. A rod or bar 13 connects the arm of the steering knuckles, and one of the steering knuckles is provided with an arm 14, which is connected by means of a rod or bar 15, with an arm 16, secured to a transverse shaft 17, mounted at its ends in brackets 18, secured to the truck frame 3, said shaft 17 is set at some distance and parallel to said bolster 4. Oppositely disposed from said arm 16, an arm 19 projects centrally from said shaft 17, in an upward direction, and has a universal joint 20 at its extreme end, which occupies the position cleared by the curving upwardly of the metal bar 7, and comes in close contact with the lower end of the king bolt 10, which latter is the common center of the trucks' oscillating and turning point, which is by preference described as the trucks universal axis. Connected to the said universal joint 20 is a bar 21, which is adapted to be operated by a steering post 22, mounted on the extreme forward end of the body 9, and out of line with the trucks' vertical center. By this means, the steering post may be arranged and held in a steady position relative to the body. The truck may turn, tilt or oscillate in any position the truck may be; the steering wheels are not affected thereby, but held in the desired position, and admit of positive steering when the steering post is turned. The rear wheels of the said truck are journaled on solid axles, and are driven by motors 23, or by any suitable gearing and any desired type now in use.

The hind truck B comprises a main frame 24, which, in general construction, is similar to the main frame 3, a bolster 25, drive wheels 26 and a supplemental truck 27. The bolster 25 is connected to a sliding support 28 by means of a king bolt 29, and is pivotally connected at its ends to the side bars of the frame 24 to admit of the latter tilting or oscillating about a horizontal axis and turning about a vertical axis, in substantially the same manner as the fore truck. A truss brace 30 connects the bolster and lower end of the king bolt 29 to opposite end portion of the sliding support 28. Rollers 31 are provided upon opposite upper corners of the bolster 25, to bear against the bottom of the body, and to serve as anti-friction members.

The hind truck receives a three-fold movement, namely, a turning movement about the king bolt 29, a tilting or oscillating movement about the horizontal axis, and a fore and aft sliding movement with the support 28, which is made necessary in order to allow for the relative turning of the two trucks, pivotally connected on one body.

When the trucks A and B are in line, as indicated in Fig. 1, their king bolt connections 10 and 29, are separated a maximum distance, but upon turning the trucks the distance between the king bolts 10 and 29 diminishes proportionately to the angle to which the trucks are turned. The king bolt 10 occupies a relatively fixed position, hence the king bolt 29 must move toward and from the king bolt 10 upon turning of the trucks, as clearly indicated in Fig. 2.

The supplemental truck 27 has a fifth wheel connection 32 with the main frame 24 of the truck B, whereby the supplemental truck may turn about a vertical axis, independently of the turning of the truck frame 24, thereby avoiding complications in turning the rear truck. The equalizing connections 2 are attached at their rear ends to the forward corners of the supplemental trucks. Hence, the rear truck is thereby adapted to turn in opposite directions to the front truck.

The body 9, in Fig. 3, comprises a main frame of any desired type and length, a power compartment 47, and a driver's seat, to contain the source of power on the mounting of the front truck to secure room and correct loading, as well as operating convenience for the driver. The steering post 22 is for the same reason disposed in advance of the driver's seat, and on the extreme forward end of the body, and out of alinement of the connections between the body and the truck, and engages the steering rod 21, as most clearly shown in Figs. 3 and 4. The body has a sliding arrangement beneath the rear end to pivotally and slidably connect the rear truck.

Figs. 10 and 11 illustrate a modification of the invention, only dispensing with a pair of driving wheels and frame 24; in all other respects, it is identically the same in operating principle, since it is adapted to a six-wheel vehicle, embodying a fore-truck D and a hind truck E. The fore truck D. is constructed in substantially the same manner as the fore truck A, hereinbefore described in detail, and is mounted to turn about a vertical axis and tilt or oscillate about a horizontal axis, which in like manner is provided with steering wheels 36 and driving wheels 37, the latter of which are driven by motors 38 or in the same identical way as described in the eight-wheel vehicle. The wheels 36 are adapted to be controlled from the steering post 39 in the body 40 and far in advance and out of alinement of the trucks and body's connecting parts. The hind truck (E) comprises a frame similar to the supplementary truck in the eight wheel device herein described. Said frame has a fifth wheel (41), a king bolt (42), driving wheels (43), the latter being propelled by suitable motors (44), or any other desired power mechanism. Cross reaches 46 are connected to the forward corners of said frame and crossing each other intermediate of their ends. The other ends are connected to the rear corners of the front truck frame, and should it be preferred to couple the two trucks closer to each other, it can readily be accomplished by connecting the said cross reaches to the bolster of front truck, without materially changing the operating effect, as most clearly shown in Figs. 10 and 11.

The body 40 in Fig. 10 is constructed substantially in the same manner as the body 9 in Fig. 3, and has a sliding bar 49 beneath the rear end to slidably connect the rear truck, a power compartment 50, a driver's seat 51, and a steering post 39, the latter being in advance of the driver's seat, to secure operating advantages, and carry the power source on the forward truck, with the result that the front truck may carry the power source and a desired amount of the general load, to insure correct loading.

From the foregoing description, taken in connection with the accompanying drawings, the advantages of the construction and the method of operation will be readily apparent to those skilled in the art to which the invention appertains, and while I have described the principle of operation of the invention, together with the device which I now consider to be the embodiment thereof, I desire to have it understood the device shown is merely illustrative, and that such changes may be made when desired, as are within the scope of the claims appended hereto.

Having thus described the invention what is claimed as new, is:—

1. In a motor vehicle, a body having driving wheels at the rear end, a truck comprising a frame, driving and steering wheels mounted beneath the forward end, a bolster between said body and truck and having connection with each, one of said connections rotatably and the other pivotally arranged, a king bolt for said pivotal connection, a truss brace to hold said king bolt in erect position, the truck being arranged to turn, tilt or oscillate about a common axis.

2. In a motor vehicle, a body having driving wheels at the rear end, a source of power on the forward end, a truck having a frame, driving and steering wheels mounted beneath said body and source of power, a bolster between said body and truck frame and having connections with each, one of said connections being rotatably and the other pivotally arranged, a king bolt for said pivotal connections, a truss brace connected to the end of said king bolt, the truck being arranged to turn, tilt or oscillate relative to said body.

3. In a motor vehicle, a body, a truss brace connected to the under side of said body, a king bolt, one end of said king bolt connecting with said body, the other end with said truss brace, a steering post in advance and out of line with said king bolt, a bolster journaled on said king bolt between said body and truss brace, a truck frame rotatably connected to the ends of said bolster, driving and steering wheels supporting said frame, the parts arranged to turn about a vertical axis, tilt or oscillate about a horizontal axis, adjustable steering mechanism between the steering post, the trucks turning and oscillating center and the steering wheels.

4. In a motor vehicle in combination a body, a steering post thereon, a four wheel driving and steering truck pivotally connected to the body, a transverse shaft about in line with the body and the trucks pivotal connections and having oppositely disposed arms, one of the arms extending to the said pivotal connections of the body and the truck, a flexible joint at the end of said arm, a rod engaging the said joint and connecting with the steering post, the other arm connected to a rod having engagements with the steering wheels.

5. In a motor vehicle, a body, a truck embodying two axles, having supporting wheels journaled thereon, side bars resiliently mounted on said axles, said side bars having their upper edges sloping outwardly and downwardly toward their extremities, to provide clearance between said body and truck, a bolster having rotary connection with said side bars and pivotal connections with said body, a truss brace to secure said bolster in erect position, the truck being adapted to turn about a vertical axis and oscillate about a horizontal axis.

6. In a motor vehicle, a body having driving wheels at the rear end, a steering post at the forward end, a truck having a frame, driving and steering wheels, said frame pivotally connected beneath said body's forward end, said connection rearward and out of line with the said steering post, said truck being adapted to turn about a vertical axis and oscillate about a horizontal axis; a universal arrangement about in line with said axis, connecting means between the said universal arrangement and the steering post, and the other connecting means to engage the steering wheels with the said universal arrangement.

7. In a motor vehicle, a body, fore and hind trucks, a truss brace connected beneath said body, a king bolt, one end connected to said body, the other end to said truss brace, a bolster journaled on said king bolt between said body and truss brace, a truck frame rotatably connected to the ends of said bolster, axles supporting said truck frame, wheels supporting said axles, connecting means between said trucks to cause the one to turn the other in opposite directions.

8. In a motor vehicle, a body, fore and hind trucks, one of the trucks pivotally connected to the body, means pivotally and slidably connecting the other truck to the body, both trucks to turn about a vertical axis and oscillate about a horizontal axis, means to steer one of the trucks, connecting means between the two trucks to adapt the one truck to cause the other truck to turn simultaneously in opposite directions, and other connecting means to cause the trucks to automatically approach and separate simultaneously with the turning thereof.

9. In a motor vehicle, a body having driving wheels supporting the rear end, a truck having a frame supported on driving and steering wheels, said frame pivotally connected beneath the forward end of said body, a steering post on said body in advance of said pivotal connection, a driver's seat and source of power mounted on said body above said pivotal connection, said truck being adapted to turn, tilt or oscillate relative to said body, flexible steering connections between said steering post the truck's turning and tilting or oscillating center and said steering wheels.

10. In a motor vehicle, a body having driving wheels at the rear end, a truck having a frame comprising side bars mounted on axles, driving and steering wheels journaled on said axles, driving mechanism for said driving wheels, steering mechanism for said steering wheels, a bolster journaled between said side bars, a king bolt to pivotally connect said bolster beneath the forward end of said body, a truss brace connected to the lower end of said king bolt and lower side of said body, a steering post on said body, located in advance of said king bolt, a driver's seat and source of power mounted on said body above said king bolt, a transverse shaft beneath and parallel with said bolster, an arm extending from said shaft to the common center of said pivotal connection about the king bolt, and in line with the rotary connection of the bolster with said side bars, a flexible joint at the end of said arm, a rod connecting said joint with the steering post and other connecting means between said shaft and said steering wheels.

11. In a motor vehicle, a body, fore and hind trucks, one of said trucks pivotally, the other slidably and pivotally connected to said body, both trucks mounted to turn about a vertical axis and tilt or oscillate about a horizontal axis, said axis set at some distance from the inner ends of the said trucks, equalizing connections between the said trucks, and attached thereto at diagonally opposite corners, a coupling bar centrally connecting the two trucks and having connections with each at a distance from the axis thereof.

12. In a motor vehicle, a body, fore and hind trucks, the fore trucks comprising driving and steering wheels, supporting a frame pivotally connected beneath the forward end of said body, the hind truck comprising a main frame pivotally connected beneath the rear end of said body, driving wheels supporting one end of said main frame, a supplementary frame pivotally connected to the other end of said main frame, driving wheels supporting said supplementary frame, connecting means between said fore truck and said supplementary frame to cause the front truck to steer the hind truck.

13. In a motor vehicle comprising a body, fore and hind trucks, comprising a frame embodying side bars, a bolster having ends projecting to pivotally connect with the side bars its submedial parts curved upwardly to clear the space about the truck's central axis, its upper middle connected with the body by means of a king bolt to admit of turning with the side members, a truss brace, each end connected to the body, its medial parts engaging the lower end of the king bolt to protect the same, the bolster elevated to provide clearance between the body and the truck.

14. In a motor vehicle the combination of a body, a sliding member under the body, fore and hind trucks, means to pivotally connect one of the trucks to the body, means to pivotally and slidably connect the other truck to the sliding member, connecting means between the trucks embodying a coupling bar having spaced members, antifriction spools therein, cables passing through said spaced members to engage the trucks at diagonally opposite corners, and engage with the said spools to take up the slack when in course of turning to adapt the one truck to automatically control the other truck.

15. In a motor vehicle, a body, a truck comprising a frame mounted on axles, driving and steering wheels journaled on said axles, a transverse bolster rotatably mounted on said frame and pivotally connected with said body, rollers on said bolster serving as antifriction members between said bolster and body.

16. A vehicle, a body, fore and hind trucks having four wheels, two axles, a frame resiliently mounted on said axles, a bolster horizontally disposed and rotatably connected to said frame; one of said trucks pivotally connected to said body, by means of a king bolt, a truss brace to hold said bolster erectly, the other truck pivotally and slidably connected to said body; connecting means between the two trucks to cause them to turn simultaneously in opposite directions, and other connecting means to cause them to automatically approach and separate simultaneously with the turning thereof.

In testimony whereof I affix my signature in presence of two witnesses.

GODFREY FELTY.

Witnesses:
WILLIAM H. WINROW,
FRANK T. WOOLFORD.